US012623147B2

(12) United States Patent
Zhou

(10) Patent No.: US 12,623,147 B2
(45) Date of Patent: May 12, 2026

(54) DISPLAY METHOD IN GAME AND APPARATUS, TERMINAL, AND STORAGE MEDIUM THEREOF

(71) Applicant: NetEase (Hangzhou) Network Co., Ltd., Hangzhou (CN)

(72) Inventor: Qiran Zhou, Hangzhou (CN)

(73) Assignee: NetEase (Hangzhou) Network Co., Ltd., Zhejiang (CN)

( * ) Notice: Subject to any disclaimer, the term of this patent is extended or adjusted under 35 U.S.C. 154(b) by 260 days.

(21) Appl. No.: 18/553,721

(22) PCT Filed: Sep. 16, 2022

(86) PCT No.: PCT/CN2022/119405
§ 371 (c)(1),
(2) Date: Oct. 2, 2023

(87) PCT Pub. No.: WO2023/226252
PCT Pub. Date: Nov. 30, 2023

(65) Prior Publication Data
US 2025/0073588 A1      Mar. 6, 2025

(30) Foreign Application Priority Data

May 23, 2022    (CN) ........................ 202210566239.X

(51) Int. Cl.
*A63F 13/5378*      (2014.01)
*A63F 13/537*      (2014.01)
(Continued)

(52) U.S. Cl.
CPC ........ *A63F 13/5378* (2014.09); *A63F 13/537* (2014.09); *A63F 13/5372* (2014.09); *A63F 13/822* (2014.09)

(58) Field of Classification Search
CPC ................ A63F 13/5378; A63F 13/537; A63F 13/5372; A63F 13/822; A63F 13/2145;
(Continued)

(56) References Cited

U.S. PATENT DOCUMENTS

| | | | |
|---|---|---|---|
| 11,079,995 B1* | 8/2021 | Hulbert ................. | G06F 3/1423 |
| 2009/0005140 A1* | 1/2009 | Rose ........................ | A63F 13/56 |
| | | | 463/40 |

(Continued)

FOREIGN PATENT DOCUMENTS

| | | |
|---|---|---|
| CN | 104246864 A | 12/2014 |
| CN | 110833694 A | 2/2020 |

(Continued)

OTHER PUBLICATIONS

Machine Translation of CN111760288A description. Accessed via the Internet. Accessed Aug. 15, 2025. <URL: https://worldwide.espacenet.com/patent/search/family/072720587/publication/CN111760288A?q=CN111760288> (Year: 2020).*

(Continued)

*Primary Examiner* — Carl V Larsen
(74) *Attorney, Agent, or Firm* — Greenberg Traurig, LLP

(57)      ABSTRACT

A display method in a game and an apparatus, a terminal, and a storage medium are provided. The method includes: determining, according to a first position at which a controlled virtual character is located, in a game scene, and a second position at which a target virtual object is located, in the game scene, azimuth information and horizontal plane relative information on the target virtual object relative to the controlled virtual character; determining a target azimuth corresponding to the target virtual object on the azimuth indicator, according to the azimuth information; determining a target horizontal plane indication area corresponding to the target virtual object on the azimuth indicator, according to
(Continued)

First Horizontal Area

Azimuth Scale

Second Horizontal Area

345  N  15  30  NE  60  75  85  105  120  SE  150  166  S  195

Azimuth Indication Icon

Controlled virtual character the horizontal plane relative information; and displaying an azimuth indication icon of the target virtual object, at a position corresponding to the target azimuth in the target horizontal plane indication area.

19 Claims, 5 Drawing Sheets

(51) Int. Cl.
*A63F 13/5372* (2014.01)
*A63F 13/822* (2014.01)

(58) Field of Classification Search
CPC ................. A63F 13/426; A63F 13/837; A63F 2300/307; A63F 2300/807
See application file for complete search history.

(56) References Cited

U.S. PATENT DOCUMENTS

2010/0179413 A1 * 7/2010 Kadour .................. A61B 8/463
600/443
2012/0009556 A1 1/2012 Best 2019/0076739 A1 * 3/2019 Ge ......................... A63F 13/537
2021/0370177 A1 * 12/2021 Li ......................... A63F 13/5255
2023/0019749 A1 * 1/2023 Lin ..................... A63F 13/5372
2023/0285859 A1 * 9/2023 Zhou ...................... A63F 13/54
2024/0050852 A1 * 2/2024 Zhang ................. A63F 13/5378
2024/0428784 A1 * 12/2024 Jiang ....................... G10L 15/22

FOREIGN PATENT DOCUMENTS

| CN | 111760288 A | 10/2020 |
| CN | 113144602 A | 7/2021 |
| CN | 114931752 A | 8/2022 |

OTHER PUBLICATIONS

Compass Height Indicator (FOSE). Online. May 31, 2019. Acessed via the Internet. Accessed Aug. 15, 2025. <URL: https://www.nexusmods.com/fallout3/mods/23626> (Year: 2019).*
English translation of the ISR of PCTCN2022119405.
English translation of the Written Opinion of the ISA for PCTCN2022119405.
International Search Report of PCTCN2022119405.
Written Opinion of the ISA for PCTCN2022119405.
English abstracts of CN cited patent documents.

* cited by examiner

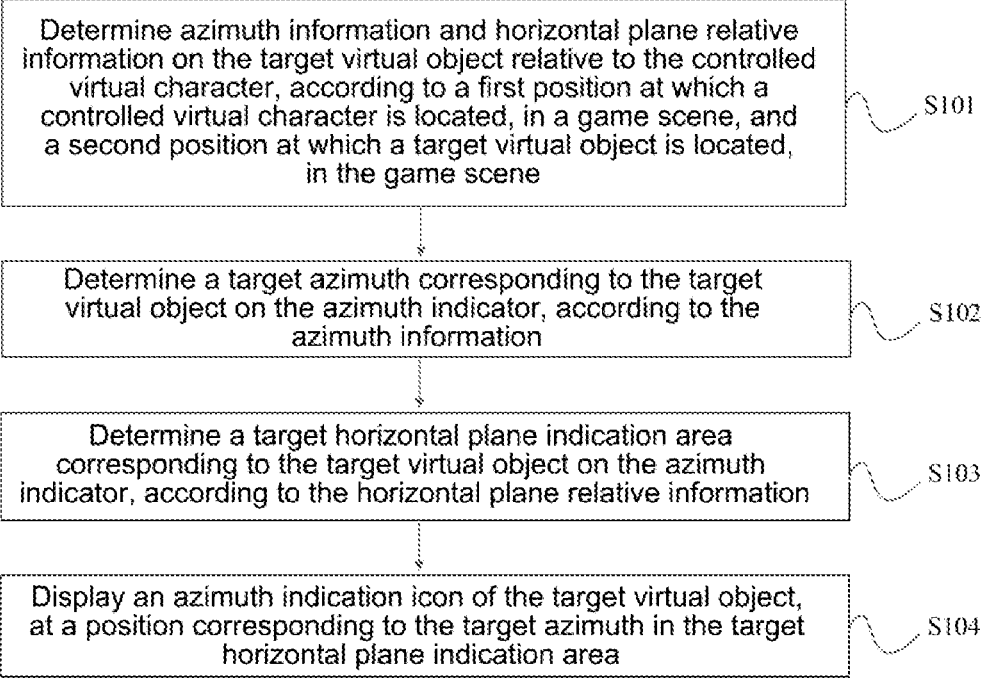

Determine azimuth information and horizontal plane relative information on the target virtual object relative to the controlled virtual character, according to a first position at which a controlled virtual character is located, in a game scene, and a second position at which a target virtual object is located, in the game scene ⟶ S101

Determine a target azimuth corresponding to the target virtual object on the azimuth indicator, according to the azimuth information ⟶ S102

Determine a target horizontal plane indication area corresponding to the target virtual object on the azimuth indicator, according to the horizontal plane relative information ⟶ S103

Display an azimuth indication icon of the target virtual object, at a position corresponding to the target azimuth in the target horizontal plane indication area ⟶ S104

FIG. 1

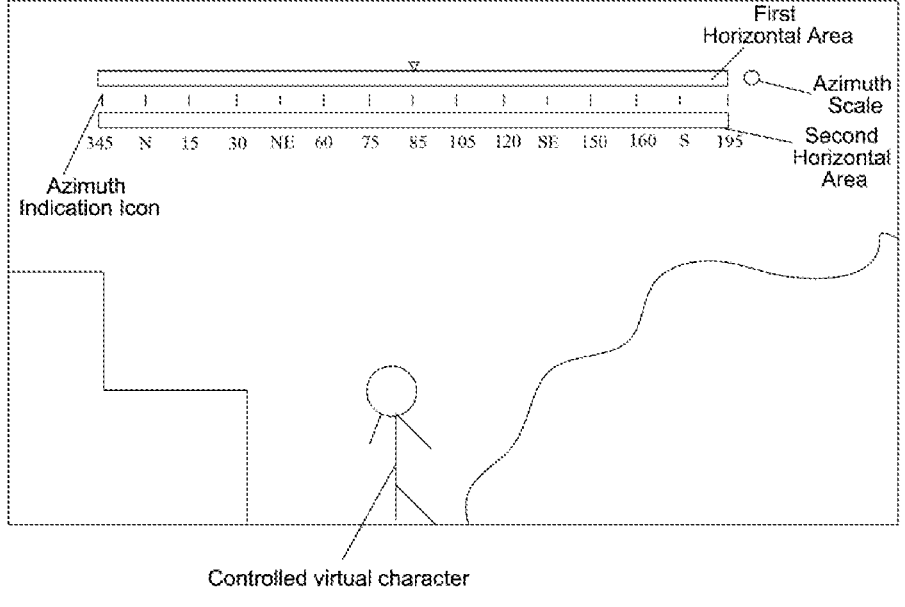

FIG. 5

Determine a vertical projection distance between the target virtual object and the controlled virtual character according to the first position and the second position          S701

If the vertical projection distance is within a preset numerical range, determine the horizontal plane relative information for indicating that the target virtual object and the controlled virtual character are in a same horizontal plane          S702

If the vertical projection distance is not within the preset numerical range, determine the horizontal plane relative information for indicating that the target virtual object and the controlled virtual character are not in a same horizontal plane          S703

FIG. 6

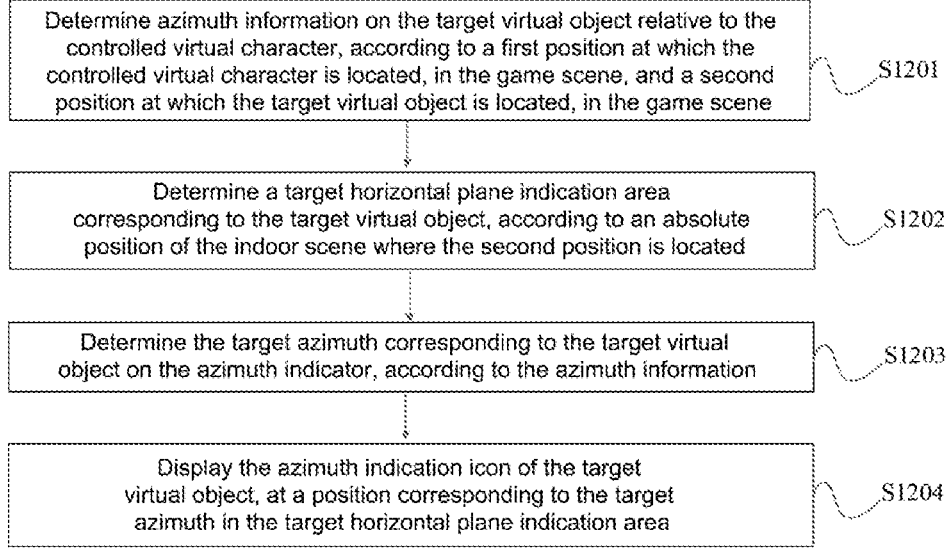

Determine azimuth information on the target virtual object relative to the controlled virtual character, according to a first position at which the controlled virtual character is located, in the game scene, and a second position at which the target virtual object is located, in the game scene          S1201

Determine a target horizontal plane indication area corresponding to the target virtual object, according to an absolute position of the indoor scene where the second position is located          S1202

Determine the target azimuth corresponding to the target virtual object on the azimuth indicator, according to the azimuth information          S1203

Display the azimuth indication icon of the target virtual object, at a position corresponding to the target azimuth in the target horizontal plane indication area          S1204

FIG. 9

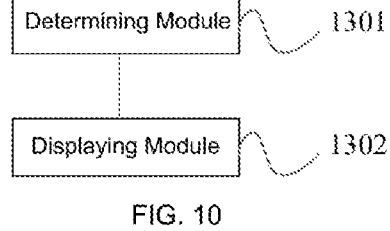

Determining Module          1301

Displaying Module          1302

FIG. 10

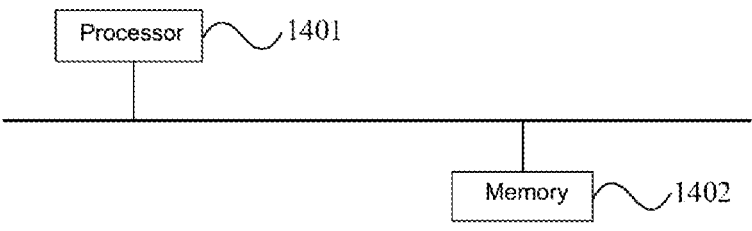

Processor          1401

Memory          1402

FIG. 11

DISPLAY METHOD IN GAME AND APPARATUS, TERMINAL, AND STORAGE MEDIUM THEREOF

CROSS-REFERENCE TO RELATED APPLICATIONS

The present disclosure claims the priority to the Chinese Patent Application No. 202210566239.X filed on May 23, 2022 and entitled "DISPLAY METHOD IN GAME AND APPARATUS, TERMINAL, AND STORAGE MEDIUM THEREOF", the entire contents of which are incorporated herein by reference for all purposes.

TECHNICAL FIELD

The present disclosure relates to the technical field of games, and specifically to a display method in a game and an apparatus, a terminal, and a storage medium.

BACKGROUND

With the progress and development of Internet technologies, there are more and more network games. In the network games, game information is displayed to a user through a graphical user interface, so that the user efficiently performs game operations to realize bidirectional human-machine interaction. The game information displayed in the graphical user interface has also become a research hotspot. In the related art, an azimuth ruler is displayed in the graphical user interface. The azimuth ruler is an icon presenting azimuth information, and the azimuth ruler can be used for indicating azimuth information (namely, information such as east, west, south, and north) on a target object relative to a controlled virtual character.

However, in the related art, the azimuth ruler can only represent the azimuth information on the target object relative to the controlled virtual character, but the presented position information is insufficient, thus reducing user experience.

SUMMARY

The present disclosure aims at, in view of the above shortcomings in the related art, providing a display method in a game and an apparatus, a terminal, and a storage medium, so as to solve the problems in the related art that an azimuth indicator can only represent an azimuth information on the target object relative to the controlled virtual character, but the presented position information is insufficient, thus reducing user experience.

In order to realize the above objectives, technical solutions used in embodiments of the present disclosure are as follows.

In a first aspect, an embodiment of the present disclosure provides a display method in a game, providing a graphical user interface by a terminal, where an azimuth indicator is displayed in the graphical user interface; and where the method includes:

determining, according to a first position at which a controlled virtual character is located, in a game scene, and a second position at which a target virtual object is located, in the game scene, azimuth information and horizontal plane relative information on the target virtual object relative to the controlled virtual character;

determining a target azimuth corresponding to the target virtual object on the azimuth indicator, according to the azimuth information;

determining a target horizontal plane indication area corresponding to the target virtual object on the azimuth indicator, according to the horizontal plane relative information; and displaying an azimuth indication icon of the target virtual object, at a position corresponding to the target azimuth in the target horizontal plane indication area.

Optionally, the azimuth indicator includes a plurality of horizontal plane indication areas; and the step of determining a target horizontal plane indication area corresponding to the target virtual object on the azimuth indicator according to the horizontal plane relative information includes:

determining, according to the horizontal plane relative information, from the plurality of horizontal plane indication areas, a horizontal plane indication area consistent with the horizontal plane relative information, as the target horizontal plane indication area.

Optionally, the method further includes:

displaying the target horizontal plane indication area, and other indication areas in the plurality of horizontal plane indication areas differently.

Optionally, the step of displaying the target horizontal plane indication area and other indication areas in the plurality of horizontal plane indication areas differently includes:

displaying the target horizontal plane indication area and the other indication areas in different display transparencies;

alternatively, displaying the target horizontal plane indication area and the other indication areas in different display colors.

Optionally, the step of determining a target azimuth corresponding to the target virtual object on the azimuth indicator according to the azimuth information includes:

determining, if the azimuth information indicates that relative azimuth of the controlled virtual character to the target virtual object is within an indication range of the azimuth indicator, the target azimuth corresponding to the target virtual object on the azimuth indicator, according to the azimuth information; and determining, if the azimuth information indicates that the relative azimuth of the controlled virtual character to the target virtual object is beyond the indication range of the azimuth indicator, an edge position on the azimuth indicator, as the target azimuth corresponding to the target virtual object.

Optionally, the step of determining, according to a first position at which a controlled virtual character is located in a game scene and a second position at which a target virtual object is located in the game scene, horizontal plane relative information on the target virtual object relative to the controlled virtual character includes:

determining a vertical projection distance between the target virtual object and the controlled virtual character, according to the first position and the second position;

determining, if the vertical projection distance is within a preset numerical range, the horizontal plane relative information for indicating that the target virtual object and the controlled virtual character are in a same horizontal plane; and determining, if the vertical projection distance is not within the preset numerical range, the horizontal plane relative information for indicating that the target virtual object and the controlled virtual character are not in a same horizontal plane.

Optionally, the step of determining a vertical projection distance between the target virtual object and the controlled virtual character according to the first position and the second position includes:

determining a first vertical projection height of the target virtual object according to the first position;

determining a second vertical projection height of the controlled virtual character according to the second position; and determining the vertical projection distance between the target virtual object and the controlled virtual character, according to the first vertical projection height and the second vertical projection height.

Optionally, if the vertical projection distance is a difference of the first vertical projection height minus the second vertical projection height, the step of determining, if the vertical projection distance is not within the preset numerical range, the horizontal plane relative information for indicating that the target virtual object and the controlled virtual character are not in a same horizontal plane includes:

determining, if the vertical projection distance is greater than the maximum value in the preset numerical range, the horizontal plane relative information for indicating that a horizontal plane where the target virtual object is located is higher than a horizontal plane where the controlled virtual character is located; and determining, if the vertical projection distance is less than the minimum value in the preset numerical range, the horizontal plane relative information for indicating that the horizontal plane where the target virtual object is located is lower than the horizontal plane where the controlled virtual character is located.

Optionally, if the vertical projection distance is a difference of the second vertical projection height minus the first vertical projection height, the step of determining, if the vertical projection distance is not within the preset numerical range, the horizontal plane relative information for indicating that the target virtual object and the controlled virtual character are not in a same horizontal plane includes:

determining, if the vertical projection distance is greater than the maximum value in the preset numerical range, the horizontal plane relative information for indicating that a horizontal plane where the target virtual object is located is lower than a horizontal plane where the controlled virtual character is located; and determining, if the vertical projection distance is less than the minimum value in the preset numerical range, the horizontal plane relative information for indicating that the horizontal plane where the target virtual object is located is higher than the horizontal plane where the controlled virtual character is located.

Optionally, both the target virtual object and the controlled virtual character are located in an indoor scene in the game scene; and the step of determining, according to a first position at which the controlled virtual character is located in the game scene and a second position at which the target virtual object is located in the game scene, horizontal plane relative information on the target virtual object relative to the controlled virtual character includes:

determining a first layer number of the indoor scene where the first position is located and a second layer number of the indoor scene where the second position is located;

determining, if the first layer number and the second layer number are the same, the horizontal plane relative information for indicating that the target virtual object and the controlled virtual character are in a same horizontal plane; and determining, if the first layer number and the second layer number are different, the horizontal plane relative information for indicating that the target virtual object and the controlled virtual character are not in a same horizontal plane.

Optionally, the step of determining, if the first layer number and the second layer number are different, the horizontal plane relative information for indicating that the target virtual object and the controlled virtual character are not in a same horizontal plane includes:

determining, if the first layer number is greater than the second layer number, the horizontal plane relative information for indicating that a horizontal plane where the target virtual object is located is lower than a horizontal plane where the controlled virtual character is located; and determining, if the first layer number is less than the second layer number, the horizontal plane relative information for indicating that the horizontal plane where the target virtual object is located is higher than the horizontal plane where the controlled virtual character is located.

Optionally, if both the target virtual object and the controlled virtual character are in an indoor scene in the game scene, the method further includes:

determining, according to the first position at which the controlled virtual character is located in the game scene, and the second position at which the target virtual object is located in the game scene, the azimuth information on the target virtual object relative to the controlled virtual character;

determining the target horizontal plane indication area corresponding to the target virtual object, according to an absolute position of the indoor scene where the second position is located, where the absolute position of the indoor scene includes: at least one indoor floor plane and a staircase position;

determining the target azimuth corresponding to the target virtual object on the azimuth indicator, according to the azimuth information; and displaying the azimuth indication icon of the target virtual object, at a position corresponding to the target azimuth in the target horizontal plane indication area.

In a second aspect, an embodiment of the present disclosure further provides a display apparatus in a game, providing a graphical user interface by a terminal, where an azimuth indicator is displayed in the graphical user interface; and where the method includes:

a determining module, configured to: determine, according to a first position at which a controlled virtual character is located, in a game scene, and a second position at which a target virtual object is located, in the game scene, azimuth information and horizontal plane relative information on the target virtual object relative to the controlled virtual character; determine a target azimuth corresponding to the target virtual object on the azimuth indicator, according to the azimuth information; and determine a target horizontal plane indication area corresponding to the target virtual object on the azimuth indicator, according to the horizontal plane relative information; and a displaying module, configured to display an azimuth indication icon of the target virtual object, at a position corresponding to the target azimuth in the target horizontal plane indication area.

Optionally, the azimuth indicator includes a plurality of horizontal plane indication areas; and the determining module is specifically configured to determine, according to the horizontal plane relative information, from the plurality of horizontal plane indication areas, a horizontal plane indication area consistent with the horizontal plane relative information, as the target horizontal plane indication area.

Optionally, the apparatus further includes:

a differently displaying module, configured to display the target horizontal plane indication area and other indication areas in the plurality of horizontal plane indication areas differently.

Optionally, the differently displaying module is specifically configured to display the target horizontal plane indication area and the other indication areas in different display transparencies; alternatively, display the target horizontal plane indication area and the other indication areas in different display colors.

Optionally, the determining module is specifically configured to: determine, if the azimuth information indicates that relative azimuth of the controlled virtual character to the target virtual object is within an indication range of the azimuth indicator, the target azimuth corresponding to the target virtual object on the azimuth indicator, according to the azimuth information; and determine, if the azimuth information indicates that the relative azimuth of the controlled virtual character to the target virtual object is beyond the indication range of the azimuth indicator, an edge position on the azimuth indicator, as the target azimuth corresponding to the target virtual object.

Optionally, the determining module is specifically configured to: determine a vertical projection distance between the target virtual object and the controlled virtual character, according to the first position and the second position; determine, if the vertical projection distance is within a preset numerical range, the horizontal plane relative information for indicating that the target virtual object and the controlled virtual character are in a same horizontal plane; and determine, if the vertical projection distance is not within the preset numerical range, the horizontal plane relative information for indicating that the target virtual object and the controlled virtual character are not in a same horizontal plane.

Optionally, the determining module is specifically configured to: determine a first vertical projection height of the target virtual object according to the first position; determine a second vertical projection height of the controlled virtual character according to the second position; and determine the vertical projection distance between the target virtual object and the controlled virtual character according to the first vertical projection height and the second vertical projection height.

Optionally, if the vertical projection distance is a difference of the first vertical projection height minus the second vertical projection height, the determining module is specifically configured to: determine, if the vertical projection distance is greater than the maximum value in the preset numerical range, the horizontal plane relative information for indicating that the horizontal plane where the target virtual object is located is higher than the horizontal plane where the controlled virtual character is located; and determine, if the vertical projection distance is less than the minimum value in the preset numerical range, the horizontal plane relative information for indicating that the horizontal plane where the target virtual object is located is lower than the horizontal plane where the controlled virtual character is located.

Optionally, if the vertical projection distance is a difference of the second vertical projection height minus the first vertical projection height, the determining module is specifically configured to: determine, if the vertical projection distance is greater than the maximum value in the preset numerical range, the horizontal plane relative information for indicating that the horizontal plane where the target virtual object is located is lower than the horizontal plane where the controlled virtual character is located; and determine, if the vertical projection distance is less than the minimum value in the preset numerical range, the horizontal plane relative information for indicating that the horizontal plane where the target virtual object is located is higher than the horizontal plane where the controlled virtual character is located.

Optionally, both the target virtual object and the controlled virtual character are located in an indoor scene in the game scene; the determining module is specifically configured to determine a first layer number of the indoor scene where the first position is located and a second layer number of the indoor scene where the second position is located; determine, if the first layer number and the second layer number are the same, the horizontal plane relative information for indicating that the target virtual object and the controlled virtual character are in a same horizontal plane; and determine, if the first layer number and the second layer number are different, the horizontal plane relative information for indicating that the target virtual object and the controlled virtual character are not in a same horizontal plane.

Optionally, if the first layer number and the second layer number are different, the determining module is specifically configured to: determine, if the first layer number is greater than the second layer number, the horizontal plane relative information for indicating that the horizontal plane where the target virtual object is located is lower than the horizontal plane where the controlled virtual character is located; and determine, if the first layer number is less than the second layer number, the horizontal plane relative information for indicating that the horizontal plane where the target virtual object is located is higher than the horizontal plane where the controlled virtual character is located.

Optionally, if both the target virtual object and the controlled virtual character are in an indoor scene in the game scene, the apparatus further includes:

a first determining module, configured to: determine, according to a first position at which the controlled virtual character is located, in the game scene, and a second position at which the target virtual object is located, in the game scene, azimuth information on the target virtual object relative to the controlled virtual character; determine a target horizontal plane indication area corresponding to the target virtual object, according to an absolute position of the indoor scene where the second position is located, where the absolute position of the indoor scene includes at least one indoor floor plane and a staircase position; and determine a target azimuth corresponding to the target virtual object on the azimuth indicator, according to the azimuth information; and a first displaying module, configured to display an azimuth indication icon of the target virtual object, at a position corresponding to the target azimuth in the target horizontal plane indication area.

In a third aspect, an embodiment of the present disclosure further provides a terminal, including: a memory and a processor, where the memory stores a computer program executable by the processor, and the processor, when executes the computer program, implements the display method in a game according to any item of the above first aspect.

In a fourth aspect, an embodiment of the present disclosure further provides a storage medium, storing a computer program, where the computer program, when read and executed, implements the display method in a game according to any item of the above first aspect.

The present disclosure has the following beneficial effects: an embodiment of the present disclosure provides a display method in a game, including: determining, according to a first position at which a controlled virtual character is located, in a game scene, and a second position at which a target virtual object is located, in the game scene, azimuth information and horizontal plane relative information on the target virtual object relative to the controlled virtual character; determining a target azimuth corresponding to the target virtual object on the azimuth indicator, according to the azimuth information; determining a target horizontal plane indication area corresponding to the target virtual object on the azimuth indicator, according to the horizontal plane relative information; and displaying an azimuth indication icon of the target virtual object, at a position corresponding to the target azimuth in the target horizontal plane indication area. The azimuth information and the horizontal plane relative information on the target virtual object are determined according to the first position and the second position; then the target azimuth and the target horizontal plane indication area are determined; the azimuth indication icon is displayed at the position corresponding to the target azimuth in the target horizontal plane indication area, where the azimuth indication icon not only can indicate the azimuth of the target virtual object relative to the controlled virtual character, but also can indicate the horizontal plane relative information, i.e., can indicate the vertical spatial relationship, whether the two are in the same horizontal plane, etc., so that the presented position information on the target virtual object is more comprehensive, and the user experience is improved.

BRIEF DESCRIPTION OF DRAWINGS

In order to more clearly illustrate technical solutions of embodiments of the present disclosure, drawings which need to be used in the embodiments will be introduced briefly below. It should be understood that the drawings below merely show some embodiments of the present disclosure, and therefore should not be considered as limitation to the scope, and a person ordinarily skilled in the art still could obtain other relevant drawings according to these drawings, without using any inventive efforts.

FIG. 1 is a schematic flowchart of a display method in a game provided in an embodiment of the present disclosure;

FIG. 5 is a schematic diagram of display of a graphical user interface provided in an embodiment of the present disclosure;

FIG. 6 is a schematic flowchart of a display method in a game provided in an embodiment of the present disclosure;

FIG. 9 is a schematic flowchart of a display method in a game provided in an embodiment of the present disclosure;

FIG. 10 is a structural schematic diagram of a display apparatus in a game provided in an embodiment of the present disclosure; and FIG. 11 is a structural schematic diagram of a terminal provided in an embodiment of the present disclosure.

DETAILED DESCRIPTION

Figure 2:
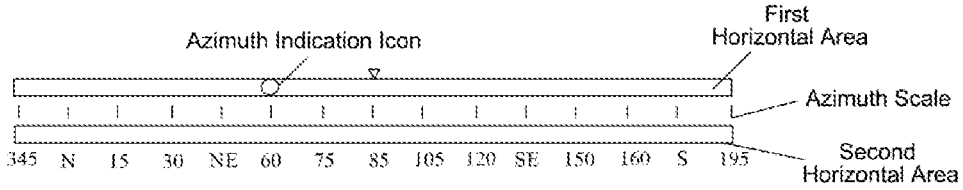
FIG. 2 is a schematic diagram of display of an azimuth indicator provided in an embodiment of the present disclosure.

In order to make objectives, technical solutions, and advantages of the embodiments of the present disclosure more clear, the technical solutions in the embodiments of the present disclosure will be described clearly and completely below with reference to the drawings in the embodiments of the present disclosure, and obviously, the embodiments described are merely some but not all embodiments of the present disclosure.

Therefore, the following detailed description of the embodiments of the present disclosure provided in the drawings is not intended to limit the scope claimed in the present disclosure, but merely represents chosen embodiments of the present disclosure. Based on the embodiments in the present disclosure, all of other embodiments, obtained by a person ordinarily skilled in the art without using any inventive efforts, shall fall within the scope of protection of the present disclosure.

In the description of the present disclosure, it should be noted that orientation or positional relationship indicated by the terms "upper", "lower", etc., if appear, are based on orientation or positional relationship shown in the drawings, or orientation or positional relationship in which the product in the present disclosure is usually placed in use, and it is only for the convenience of describing the present disclosure and simplifying the description, rather than indicating or implying that the related apparatus or element must be in a specific orientation, or constructed or operated in a specific orientation, and therefore it cannot be understood as a limitation to the present disclosure.

Besides, the terms "first", "second" and the like in the description, the claims, and the above drawings of the present disclosure are used for distinguishing similar objects, and are not necessarily used to describe a specific order or sequence. It should be understood that the terms used in this way can be exchangeable under appropriate circumstances, so that the embodiments of the present disclosure described herein can be implemented in an order other than those illustrated or described herein. Besides, terms "include (comprise)", "have", and any variants thereof are intended to be non-exclusive, for example, a process, a method, a system, a product or a device that contains a series of steps or units is not necessarily limited to those steps or units expressly listed, but may include other steps or units not expressly listed or inherent to such process, method, product or device.

It should be noted that features in the embodiments of the present disclosure may be combined with each other without conflict.

With the progress and development of Internet technologies, there are more and more network games. In the network game, game information is displayed to a user through a graphical user interface, so that the user efficiently performs game operations to realize bidirectional human-machine interaction. The game information displayed in the graphical user interface has also become a research hotspot.

In the related art, an azimuth ruler is displayed in the graphical user interface. The azimuth ruler is an icon presenting azimuth information, and the azimuth ruler can be used for indicating azimuth information (namely, information such as east, west, south, and north) on a target object relative to a controlled virtual character. However, in the related art, the azimuth ruler can only represent the azimuth information on the target object relative to the controlled virtual character, but the presented position information is insufficient, thus reducing user experience.

In view of the above technical problems existing in the related art, an embodiment of the present disclosure provides a display method in a game, where according to a first position where a controlled virtual character is located, and a second position where a target virtual object is located, not only orientation information on the target virtual object relative to the controlled virtual character can be determined, but also horizontal plane relative information can be determined; a target azimuth on an azimuth indicator is determined based on the azimuth information, and a target horizontal plane indication area is determined on a graphical user interface based on the horizontal plane relative information; then an azimuth indication icon is displayed at a position corresponding to the target azimuth in the target horizontal plane indication area, where the azimuth indication icon not only can indicate an azimuth of the target virtual object relative to the controlled virtual character, but also can indicate the horizontal plane relative information, i.e., can indicate whether a vertical spatial relationship is in the same horizontal plane, so that position information on the presented target virtual object is more comprehensive, and user experience is improved.

As a possible embodiment of the display method in a game disclosed in the present disclosure, this method can be run on a touch terminal or a server. In the above, the touch terminal may be a local terminal. When the display method in a game is run on a server, this method can be realized and executed based on a cloud interaction system, where the cloud interaction system includes the server and a client device.

In an optional embodiment, various cloud applications, for example, a cloud game, may be run on the cloud interaction system. Taking the cloud game as an example, the cloud game refers to a cloud computing-based game mode. In a running mode of the cloud game, a running subject of a game program is separated from a game screen presentation subject, storage and running of the display method in a game are completed on a cloud game server, and the client device functions to receive and transmit data and present the game screen, for example, the client device may be a display device with a data transmission function close to a user side, e.g., a mobile terminal, a television, a computer, a handheld computer, etc.; however, the terminal that performs information processing is the cloud game server in the cloud. When playing, the player operates the client device to send an operation instruction to the cloud game server, the cloud game server runs the game according to the operation instruction, encodes and compresses data such as the game screen, and returns the same to the client device via network, and finally, the client device decodes the data and outputs the game screen.

In an optional embodiment, the terminal may be a local terminal. Taking a game as an example, the local terminal stores a game program and is configured to present a game screen. The local terminal is configured to interact with a player via a graphical user interface, i.e., conventionally download and install the game program and run the same through an electronic device. The local terminal may provide the graphical user interface to the player in various manners, for example, the graphical user interface may be rendered and displayed on a display screen of the terminal, or may be provided to the player by means of holographic projection. For example, the local terminal may include a display screen and a processor, where the display screen is configured to present the graphical user interface, the graphical user interface includes the game screen, and the processor is configured to run the game, generate the graphical user interface and control the display of the graphical user interface on the display screen.

For the display method in a game provided in an embodiment of the present disclosure, an execution body thereof may be a terminal, and a graphical user interface can be displayed by the terminal. In practical applications, the terminal may be any one of the following: a desktop computer, a notebook computer, a tablet computer, a smart phone, etc., which is not specifically limited in the embodiments of the present disclosure.

In the above, the graphical user interface can be provided by the terminal, an azimuth indicator can be displayed in the graphical user interface, and a game scene also can be displayed in the graphical user interface.

Below, taking the terminal as the execution body, a display method in a game provided in an embodiment of the present disclosure is illustrated.

FIG. 1 is a schematic flowchart of a display method in a game provided in an embodiment of the present disclosure, and as shown in FIG. 1, this method may include:

S101, determining, according to a first position at which a controlled virtual character is located, in a game scene, and a second position at which a target virtual object is located, in the game scene, azimuth information and horizontal plane relative information on the target virtual object relative to the controlled virtual character.

In the above, the first position may be three-dimensional coordinates of the controlled virtual character in the game scene, and the second position may be three-dimensional coordinates of the target virtual object in the game scene.

It should be noted that the azimuth information can be configured to represent an azimuth of the target virtual object relative to the controlled virtual character, i.e., information such as east, south, west, and north. The horizontal plane relative information can be configured to represent a vertical spatial relationship of the target virtual object relative to the controlled virtual character, i.e., whether the target virtual object and the controlled virtual character are in the same horizontal plane, which can represent whether the target virtual object is above or below the controlled virtual character.

In practical applications, the controlled virtual character can be displayed in the game scene, and the target virtual object may be a position, an article or the like marked by a teammate in a game team to which the controlled virtual character belongs, and certainly, also may be a position or an article marked by the system, which can be set according to practical requirements, and is not specifically limited in the embodiments of the present disclosure.

S102, determining a target azimuth corresponding to the target virtual object on the azimuth indicator, according to the azimuth information.

In the above, the azimuth indicator can be provided thereon with a plurality of azimuth identifiers.

In some embodiments, the azimuth indicator may be a strip-shaped and laterally distributed azimuth indicator, the azimuth indicator includes a plurality of laterally distributed scales, and each scale has a corresponding azimuth identifier. The terminal can determine the target azimuth corresponding to the target virtual object from the plurality of azimuth identifiers of the azimuth indicator, according to the azimuth information.

In the embodiments of the present disclosure, the corresponding azimuth identifier of each scale may include: an azimuth description identifier and an azimuth numerical value identifier. In the above, the azimuth description identifier may be a combination of at least one of the following: east (e), south (s), west (w), and north (n). The azimuth numerical value identifier may be a specific numerical value.

S103, determining a target horizontal plane indication area corresponding to the target virtual object on the azimuth indicator, according to the horizontal plane relative information.

In some embodiments, the terminal can determine, according to the horizontal plane relative information, whether the target virtual object and the controlled virtual object are in the same horizontal plane, i.e., the vertical spatial relationship between the target virtual object and the controlled virtual object; and determine the target horizontal plane indication area corresponding to the target virtual object on the azimuth indicator, according to the vertical spatial relationship.

In the above, the vertical spatial relationship may represent that the target virtual object and the controlled virtual object are in the same horizontal plane; and it also may represent that the target virtual object and the controlled virtual object are in different horizontal planes, where the target virtual object is above the controlled virtual object, or the target virtual object is below the controlled virtual object.

S104, displaying an azimuth indication icon of the target virtual object, at a position corresponding to the target azimuth in the target horizontal plane indication area.

In some embodiments, the terminal determines a vertical line at the target azimuth, and displays the azimuth indication icon, at the vertical line in the target horizontal plane indication area on the azimuth indicator. In the above, the azimuth indication icon can reflect both the azimuth of the target virtual object relative to the controlled virtual character and the vertical spatial relationship between the target virtual object and the controlled virtual character.

To sum up, the embodiments of the present disclosure provide a display method in a game, including: determining, according to the first position at which the controlled virtual character is located, in the game scene, and the second position at which the target virtual object is located, in the game scene, the azimuth information and the horizontal plane relative information on the target virtual object relative to the controlled virtual character; determining the target azimuth corresponding to the target virtual object on the azimuth indicator, according to the azimuth information;

determining the target horizontal plane indication area corresponding to the target virtual object on the azimuth indicator on the graphical user interface, according to the horizontal plane relative information; and displaying the azimuth indication icon of the target virtual object, at the position corresponding to the target azimuth in the target horizontal plane indication area. The azimuth information and the horizontal plane relative information on the target virtual object are determined according to the first position and the second position; then the target azimuth and the target horizontal plane indication area are determined; the azimuth indication icon is displayed at the position corresponding to the target azimuth in the target horizontal plane indication area, where the azimuth indication icon not only can indicate the azimuth of the target virtual object relative to the controlled virtual character, but also can indicate the horizontal plane relative information, i.e., can indicate the vertical spatial relationship, whether the two are in the same horizontal plane, etc., so that the presented position information on the target virtual object is more comprehensive, and the user experience is improved.

It should be noted that, the azimuth information and the horizontal plane relative information will be updated in real time as the positions at which the target virtual object and the controlled virtual character are located change.

Optionally, the azimuth indicator includes a plurality of horizontal plane indication areas.

Figure 3:
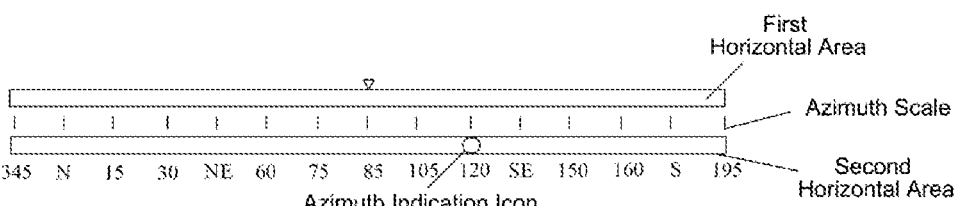
FIG. 3 is a schematic diagram of display of an azimuth indicator provided in an embodiment of the present disclosure.

FIG. 2 and FIG. 3 are schematic diagrams of display of an azimuth indicator provided in an embodiment of the present disclosure, and as shown in FIG. 2 and FIG. 3, the azimuth indicator is displayed on the graphical user interface, and azimuth scales are further displayed on the azimuth indicator, where a first horizontal plane indication area is displayed above the azimuth scales, and a second horizontal plane indication area is displayed below the azimuth scales.

Certainly, FIG. 2 and FIG. 3 are only examples, and a plurality of horizontal plane indication areas horizontally arranged further may be displayed in the azimuth indicator, a plurality of horizontal plane indication areas horizontally arranged also may be displayed above the azimuth scales, and a plurality of horizontal plane indication areas horizontally arranged also may be displayed below the azimuth scales, which can be set according to practical requirements, and is not specifically limited in the embodiments of the present disclosure.

A process of determining a target horizontal plane indication area corresponding to the target virtual object on the azimuth indicator according to the horizontal plane relative information in the above S103 may include:

determining, according to the horizontal plane relative information, from the plurality of horizontal plane indication areas, a horizontal plane indication area consistent with the horizontal plane relative information on the azimuth indicator, as the target horizontal plane indication area.

In the above, if the horizontal plane relative information indicates that the controlled virtual character and the target virtual object are in different horizontal planes, the horizontal plane relative information can indicate that the target virtual object is above the controlled virtual character, or the target virtual object is below the controlled virtual character.

In some embodiments, as shown in FIG. 2, if the horizontal plane relative information can indicate that the target virtual object is above the controlled virtual character, a first horizontal plane indication area above the azimuth indicator is determined from the plurality of horizontal plane indication areas as the target horizontal plane indication area. As shown in FIG. 3, if the horizontal plane relative information can indicate that the target virtual object is below the controlled virtual character, a second horizontal plane indication area below the azimuth indicator is determined from the plurality of horizontal plane indication areas as the target horizontal plane indication area.

In the above, if a plurality of horizontal plane indication areas exist above the azimuth scales, the target horizontal plane indication area is selected from the plurality of horizontal plane indication areas according to specific horizontal plane relative information; and by the same reasoning, if a plurality of horizontal plane indication areas exist below the azimuth scales, the target horizontal plane indication area is selected from the plurality of horizontal plane indication areas according to the specific horizontal plane relative information.

In addition, as shown in FIG. 2, the azimuth information corresponding to the target virtual object may be 60; and as shown in FIG. 3, the azimuth information corresponding to the target virtual object may be 120.

In an embodiment of the present disclosure, if the horizontal plane relative information indicates that the controlled virtual character and the target virtual object are in a same horizontal plane, it is determined that the target horizontal plane indication area is an area where the azimuth scales in the azimuth indicator are located.

Figure 4:
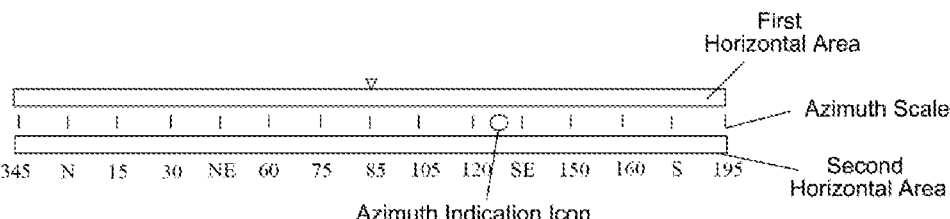
FIG. 4 is a schematic diagram of display of an azimuth indicator provided in an embodiment of the present disclosure.

FIG. 4 is a schematic diagram of display of a graphical user interface provided in an embodiment of the present disclosure, and as shown in FIG. 4, a horizontal area where the azimuth indicator is located is the target horizontal plane indication area, and the azimuth information on the target virtual object is 125.

To sum up, by means of layering for the azimuth indicator, scale information on vertical dimension is visually presented to the user, thus reducing communication difficulty of the user in the game, and improving the game experience.

Optionally, this method further may include:

displaying the target horizontal plane indication area and other indication areas in the plurality of horizontal plane indication areas differently.

It should be noted that, displaying the target horizontal plane indication area and other indication areas differently can make the target horizontal plane indication area more striking, so that the user can more easily observe the azimuth indication icon displayed in the target horizontal plane indication area.

In addition, when the target horizontal plane indication area is not determined, that is, in an initial state, display modes of the plurality of horizontal plane indication areas are similar. With the change of the horizontal plane relative information, the target horizontal plane indication area changes, and a display mode thereof also dynamically changes.

Optionally, the step of displaying the target horizontal plane indication area and other indication areas in the plurality of horizontal plane indication areas differently includes:

displaying the target horizontal plane indication area and other indication areas in different display transparencies;

alternatively, displaying the target horizontal plane and other indication areas in different display colors.

In some embodiments, the transparency of the target horizontal plane indication area is greater than a preset transparency threshold, and the transparency of other indication areas is less than the preset transparency threshold;

and the color of the target horizontal plane indication area is set to be a bright color, and the color of other indication areas is set to be a dark color.

To sum up, the design of upper, middle, and lower layered azimuth indicator, in combination with background color change, can enable the user to more intuitively sense a specific azimuth of the target virtual object relative to the user, more effectively assist the user in understanding a position at which the target virtual object is located, and reduce scale-reading time.

Optionally, a process of determining a target azimuth corresponding to the target virtual object on the azimuth indicator according to the azimuth information in the above S102 may include:

determining, if the azimuth information indicates that relative azimuth of the controlled virtual character to the target virtual object is within an indication range of the azimuth indicator, the target azimuth corresponding to the target virtual object on the azimuth indicator, according to the azimuth information.

In an embodiment of the present disclosure, if the azimuth information indicates that the relative azimuth of the controlled virtual character to the target virtual object is within the indication range of the azimuth indicator, the target azimuth corresponding to the target virtual object can be found from a plurality of azimuth identifiers of the azimuth indicator.

For example, in the above FIG. 2 to FIG. 4, the indication range of the azimuth indicator may be 0 to 195, and 345. The azimuth information in FIG. 2 is 60, the azimuth information in FIG. 3 is 120, and the azimuth information in FIG. 4 is 125.

If the azimuth information indicates that the relative azimuth of the controlled virtual character to the target virtual object is beyond the indication range of the azimuth indicator, an edge position on the azimuth indicator is determined as the target azimuth corresponding to the target virtual object.

In some embodiments, if the azimuth information indicates that the relative azimuth of the controlled virtual character to the target virtual object is beyond the indication range of the azimuth indicator, a left side or a right side of an area where the azimuth indicator is located is taken as the target azimuth according to the azimuth information.

In addition, the target horizontal plane area on the azimuth indicator also can be determined according to the horizontal plane relative information. If the horizontal plane relative information indicates that the target virtual object is above the controlled virtual character, the azimuth indication icon can be displayed above the azimuth scales; and if the horizontal plane relative information indicates that the target virtual object is below the controlled virtual character, the azimuth indication icon can be displayed below the azimuth scales.

FIG. 5 is a schematic diagram of display of a graphical user interface provided in an embodiment of the present disclosure, and as shown in FIG. 5, if the azimuth information is 210, beyond the indication range of the azimuth indicator, where 210 is close to the azimuth identifier 195 at a right edge of the azimuth indicator, it can be determined that the target azimuth is at the right of the azimuth indicator; besides, the horizontal plane relative information indicates that the target virtual object is above the controlled virtual object, the azimuth indication icon can be above the azimuth scales, and the azimuth indication icon can be displayed at upper right of the azimuth scales, where the displayed azimuth indication icon is as shown in FIG. 5.

In addition, as shown in FIG. 5, a game scene further can be displayed in the graphical user interface, the game scene may include therein the controlled virtual character, and the azimuth indicator can be displayed in a middle position at the top of the graphical user interface.

To sum up, when the relative azimuth of the controlled virtual character to the target virtual object is beyond the indication range of the azimuth indicator, it can be realized that the azimuth indication icon is displayed in a left area or a right area of the azimuth indicator, and information presentation of the azimuth indication icon out of the range of the azimuth indicator increases ductility of displaying information on the azimuth indicator, helps the user capture key information more timely, and enhances predictability of information acquisition.

Optionally, FIG. 6 is a schematic flowchart of a display method in a game provided in an embodiment of the present disclosure, and as shown in FIG. 6, if the target virtual object and/or the controlled virtual character is in an outdoor scene in the game scene, the process of determining, according to a first position at which a controlled virtual character is located in a game scene, and a second position at which a target virtual object is located in the game scene, azimuth information and horizontal plane relative information on the target virtual object relative to the controlled virtual character in the above S101 may include:

S701, determining a vertical projection distance between the target virtual object and the controlled virtual character, according to the first position and the second position.

In some embodiments, the vertical projection distance from the target virtual object to the controlled virtual character is D; if the target virtual object is above the controlled virtual character, the vertical projection distance may be positive; and if the target virtual object is below the controlled virtual character, the vertical projection distance may be negative.

S702, determining, if the vertical projection distance is within a preset numerical range, the horizontal plane relative information for indicating that the target virtual object and the controlled virtual character are in a same horizontal plane.

S703, determining, if the vertical projection distance is not within the preset numerical range, the horizontal plane relative information for indicating that the target virtual object and the controlled virtual character are not in a same horizontal plane.

It should be noted that, if the vertical projection distance is not within the preset numerical range, a horizontal plane where the target virtual object is located is above a horizontal plane where the controlled virtual character is located, or the horizontal plane where the target virtual object is located is below the horizontal plane where the controlled virtual character is located.

Figure 7:
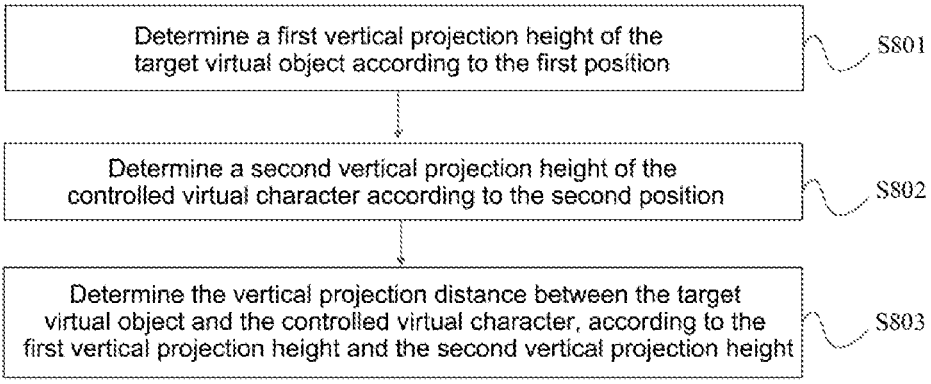
FIG. 7 is a schematic flowchart of a display method in a game provided in an embodiment of the present disclosure.

Optionally, FIG. 7 is a schematic flowchart of a display method in a game provided in an embodiment of the present disclosure, and as shown in FIG. 7, the step of determining, if the vertical projection distance is not within the preset numerical range, the horizontal plane relative information for indicating that the target virtual object and the controlled virtual character are not in a same horizontal plane in the above S701 includes:

S801, determining a first vertical projection height of the target virtual object according to the first position;

S802, determining a second vertical projection height of the controlled virtual character according to the second position; and S803, determining the vertical projection distance between the target virtual object and the controlled virtual character according to the first vertical projection height and the second vertical projection height.

In some embodiments, a difference between the first vertical projection height and the second vertical projection height is calculated, or a difference between the second vertical projection height and the first vertical projection height is calculated, and the vertical projection distance between the target virtual object and the controlled virtual character is determined according to the difference. In the above, the vertical projection distance may be a value that is positive or negative.

Optionally, the step of determining, if the vertical projection distance is not within the preset numerical range, the horizontal plane relative information for indicating that the target virtual object and the controlled virtual character are not in a same horizontal plane in the above S703 includes:

determining, if the vertical projection distance is greater than the maximum value in the preset numerical range, the horizontal plane relative information for indicating that the horizontal plane where the target virtual object is located is higher than the horizontal plane where the controlled virtual character is located; and determining, if the vertical projection distance is less than the minimum value in the preset numerical range, the horizontal plane relative information for indicating that the horizontal plane where the target virtual object is located is lower than the horizontal plane where the controlled virtual character is located.

In the above, the vertical projection distance is a difference of the first vertical projection height minus the second vertical projection height, and the vertical projection distance can be represented by M.

In some embodiments, the preset numerical range may be [−N, N], if −N<=M<=N, it is judged that the target virtual object and the controlled virtual character are in the same horizontal plane; and if M>N, it is judged that the target virtual object is above the controlled virtual character, and if M<N, it is judged that the target virtual object is below the controlled virtual character.

Optionally, the step of determining, if the vertical projection distance is not within the preset numerical range, the horizontal plane relative information for indicating that the target virtual object and the controlled virtual character are not in a same horizontal plane in the above S703 includes:

determining, if the vertical projection distance is greater than the maximum value in the preset numerical range, the horizontal plane relative information for indicating that the horizontal plane where the target virtual object is located is lower than the horizontal plane where the controlled virtual character is located; and determining, if the vertical projection distance is less than the minimum value in the preset numerical range, the horizontal plane relative information for indicating that the horizontal plane where the target virtual object is located is higher than the horizontal plane where the controlled virtual character is located.

In the above, the vertical projection distance is a difference of the second vertical projection height minus the first vertical projection height, and the vertical projection distance can be represented by D.

In some embodiments, the preset numerical range may be [−N, N], if −N<=D<=N, it is judged that the target virtual object and the controlled virtual character are in the same horizontal plane; and if D>N, it is judged that the target virtual object is below the controlled virtual character, and if D<N, it is judged that the target virtual object is above the controlled virtual character.

It should be noted that, the preset numerical range can be set according to an actual requirement or an empirical value, which is not specifically limited in the embodiments of the present disclosure.

Figure 8:
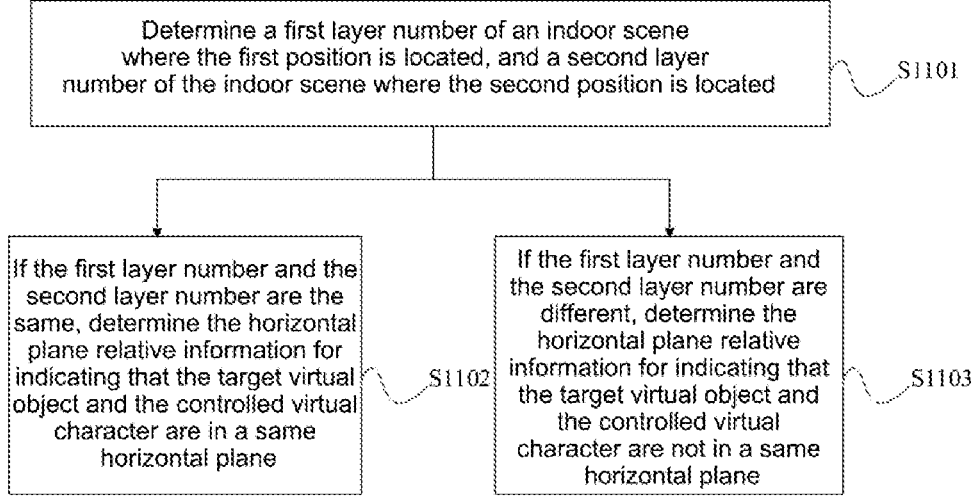
FIG. 8 is a schematic flowchart of a display method in a game provided in an embodiment of the present disclosure.

Optionally, both the target virtual object and the controlled virtual character are located in the indoor scene in the game scene. FIG. 8 is a schematic flowchart of a display method in a game provided in an embodiment of the present disclosure, and as shown in FIG. 8, a process of determining a vertical projection distance between the target virtual object and the controlled virtual character according to the first position and the second position in the above S701 may include:

S1101, determining a first layer number of the indoor scene where the first position is located, and a second layer number of the indoor scene where the second position is located.

In the above, the first layer number is for representing a floor where the controlled virtual character is located, and the second layer number is for representing a floor where the target virtual object is located;

S1102, determining, if the first layer number and the second layer number are the same, the horizontal plane relative information for indicating that the target virtual object and the controlled virtual character are in a same horizontal plane.

It should be noted that if the first layer number and the second layer number are the same, it is indicated that the target virtual object and the controlled virtual character are on the same floor.

S1103, determining, if the first layer number and the second layer number are different, the horizontal plane relative information for indicating that the target virtual object and the controlled virtual character are not in a same horizontal plane.

In the above, if the first layer number and the second layer number are different, it is indicated that the target virtual object and the controlled virtual character are on the same floor, and the floor where the target virtual object is located is higher than the floor where the controlled virtual character is located, or the floor where the controlled virtual character is located is higher than the floor where the target virtual object is located.

In an embodiment of the present disclosure, there may be multi-floor buildings in the indoor scene in the game scene, and for some multi-floor buildings, a floor height may be too low. If judgment is made based on steps in the above FIG. 8 to FIG. 10, when the target virtual object and the controlled virtual character are on adjacent floors, it is easy to determine that the target virtual object and the controlled virtual character are in the same horizontal plane, causing misjudgment, while if judgment is made based on the steps in the above FIG. 11, misjudgment can be avoided, then accuracy of judgment result can be improved.

Optionally, the above S1103 may include: determining, if the first layer number is greater than the second layer number, the horizontal plane relative information for indicating that the horizontal plane where the target virtual object is located is lower than the horizontal plane where the controlled virtual character is located; and determining, if the first layer number is less than the second layer number, the horizontal plane relative information for indicating that the horizontal plane where the target virtual object is located is higher than the horizontal plane where the controlled virtual character is located.

Optionally, FIG. 9 is a schematic flowchart of a display method in a game according to an embodiment of the present disclosure, and as shown in FIG. 9, if both the target virtual object and the controlled virtual character are in an indoor scene in a game scene, the method further includes:

S1201, determining, according to a first position at which the controlled virtual character is located, in the game scene, and a second position at which the target virtual object is located, in the game scene, azimuth information on the target virtual object relative to the controlled virtual character.

In the above, the first position may be three-dimensional coordinates of the controlled virtual character in the game scene, and the second position may be three-dimensional coordinates of the target virtual object in the game scene. The azimuth information can be configured to represent an azimuth of the target virtual object relative to the controlled virtual character, i.e., information such as east, south, west, and north.

In practical applications, the controlled virtual character can be displayed in the game scene, and the target virtual object may be a position, an article or the like marked by a teammate in a game team to which the controlled virtual character belongs.

S1202, determining a target horizontal plane indication area corresponding to the target virtual object, according to an absolute position of the indoor scene where the second position is located.

In the above, the absolute position of the indoor scene includes: at least one indoor floor plane and a staircase position.

In some embodiments, the floor plane and the staircase position where the target virtual object is located are determined according to the second position, and the target horizontal plane indication area corresponding to the target virtual object is determined, according to the floor plane and the staircase position where the target virtual object is located.

Exemplarily, the target horizontal plane indication area includes: a first-floor plane, a second-floor plane, and a third-floor plane; the first-floor plane and stairs between the first-floor plane and the second-floor plane may be corresponding to a first target horizontal plane indication area; the second-floor plane and stairs between the second-floor plane and the third-floor plane may be corresponding to a second target horizontal plane indication area; and the third-floor plane may be corresponding to a third target horizontal plane indication area. In the above, the second horizontal plane indication area can be provided between the first horizontal plane indication area and the third horizontal plane indication area.

S1203, determining the target azimuth corresponding to the target virtual object on the azimuth indicator according to the azimuth information.

In the above, a process of S1203 is similar to the process of the above S102, and is not repeated herein.

S1204, displaying the azimuth indication icon of the target virtual object, at a position corresponding to the target azimuth in the target horizontal plane indication area.

In an embodiment of the present disclosure, the azimuth indication icon of the target virtual object can be configured to indicate a floor plane and a stair position where the target virtual object is located, and an azimuth of the target virtual object relative to the controlled virtual character.

It should be noted that the azimuth indicator in FIG. 9 and the azimuth indicator in FIG. 1 may be a shared azimuth indicator, with a change in display logic of the azimuth indication icon for the target virtual object. Certainly, the azimuth indicator in FIG. 9 and the azimuth indicator in FIG. 1 may be different azimuth indicators, and positions displayed by the two azimuth indicators are different, which is not specifically limited in the embodiments of the present disclosure.

Below, the display apparatus in a game, the terminal, the storage medium, and so on used to execute the display method in a game provided in the present disclosure are illustrated, and for specific implementation processes and technical effects thereof, reference is made to relevant contents of the above display method in a game, and it will not be repeated again.

FIG. 10 is a structural schematic diagram of the display apparatus in a game provided in an embodiment of the present disclosure, and as shown in FIG. 10, this apparatus may include:

a determining module 1301, configured to: determine, according to a first position at which a controlled virtual character is located, in a game scene, and a second position at which a target virtual object is located, in the game scene, azimuth information and horizontal plane relative information on the target virtual object relative to the controlled character; determine a target azimuth corresponding to the target virtual object on the azimuth indicator, according to the azimuth information; and determine a target horizontal plane indication area corresponding to the target virtual object on the azimuth indicator, according to the horizontal plane relative information; and a displaying module 1302, configured to display an azimuth indication icon of the target virtual object, at a position corresponding to the target azimuth in the target horizontal plane indication area.

Optionally, the azimuth indicator includes a plurality of horizontal plane indication areas; and the determining module 1301 is specifically configured to determine, according to the horizontal plane relative information, from the plurality of horizontal plane indication areas, a horizontal plane indication area consistent with the horizontal plane relative information, as the target horizontal plane indication area.

Optionally, the apparatus further includes:

a differently displaying module, configured to display the target horizontal plane indication area and other indication areas in the plurality of horizontal plane indication areas differently.

Optionally, the differently displaying module is specifically configured to display the target horizontal plane indication area and the other indication areas in different display transparencies; alternatively, display the target horizontal plane indication area and the other indication areas in different display colors.

Optionally, the determining module 1301 is specifically configured to: determine, if the azimuth information indicates that relative azimuth of the controlled virtual character to the target virtual object is within an indication range of the azimuth indicator, the target azimuth corresponding to the target virtual object on the azimuth indicator, according to the azimuth information; and determine, if the azimuth information indicates that the relative azimuth of the controlled virtual character to the target virtual object is beyond the indication range of the azimuth indicator, an edge position on the azimuth indicator, as the target azimuth corresponding to the target virtual object.

Optionally, the determining module 1301 is specifically configured to: determine a vertical projection distance between the target virtual object and the controlled virtual character, according to the first position and the second position; determine, if the vertical projection distance is within a preset numerical range, the horizontal plane relative information for indicating that the target virtual object and the controlled virtual character are in a same horizontal plane; and determine, if the vertical projection distance is not within the preset numerical range, the horizontal plane relative information for indicating that the target virtual object and the controlled virtual character are not in a same horizontal plane.

Optionally, the determining module 1301 is specifically configured to: determine a first vertical projection height of the target virtual object according to the first position; determine a second vertical projection height of the controlled virtual character according to the second position; and determine the vertical projection distance between the target virtual object and the controlled virtual character according to the first vertical projection height and the second vertical projection height.

Optionally, if the vertical projection distance is a difference of the first vertical projection height minus the second vertical projection height, the determining module is specifically configured to: determine, if the vertical projection distance is greater than the maximum value in the preset numerical range, the horizontal plane relative information for indicating that the horizontal plane where the target virtual object is located is higher than the horizontal plane where the controlled virtual character is located; and determine, if the vertical projection distance is less than the minimum value in the preset numerical range, the horizontal plane relative information for indicating that the horizontal plane where the target virtual object is located is lower than the horizontal plane where the controlled virtual character is located.

Optionally, if the vertical projection distance is a difference of the second vertical projection height minus the first vertical projection height, the determining module is specifically configured to: determine, if the vertical projection distance is greater than the maximum value in the preset numerical range, the horizontal plane relative information for indicating that the horizontal plane where the target virtual object is located is lower than the horizontal plane where the controlled virtual character is located; and determine, if the vertical projection distance is less than the minimum value in the preset numerical range, the horizontal plane relative information for indicating that the horizontal plane where the target virtual object is located is higher than the horizontal plane where the controlled virtual character is located.

Optionally, both the target virtual object and the controlled virtual character are located in an indoor scene in the game scene; the determining module 1301 is specifically configured to determine a first layer number of the indoor scene where the first position is located and a second layer number of the indoor scene where the second position is located; determine, if the first layer number and the second layer number are the same, the horizontal plane relative information for indicating that the target virtual object and the controlled virtual character are in a same horizontal plane; and determine, if the first layer number and the second layer number are different, the horizontal plane relative information for indicating that the target virtual object and the controlled virtual character are not in a same horizontal plane.

Optionally, if the first layer number and the second layer number are different, the determining module 1301 is specifically configured to: determine, if the first layer number is greater than the second layer number, the horizontal plane relative information for indicating that the horizontal plane where the target virtual object is located is lower than the horizontal plane where the controlled virtual character is located; and determine, if the first layer number is less than the second layer number, the horizontal plane relative information for indicating that the horizontal plane where the target virtual object is located is higher than the horizontal plane where the controlled virtual character is located.

Optionally, if both the target virtual object and the controlled virtual character are in an indoor scene in the game scene, the apparatus further includes:

a first determining module, configured to: determine, according to a first position at which the controlled virtual character is located, in the game scene, and a second position at which the target virtual object is located, in the game scene, azimuth information on the target virtual object relative to the controlled virtual character; determine a target horizontal plane indication area corresponding to the target virtual object, according to an absolute position of the indoor scene where the second position is located, where the absolute position of the indoor scene includes at least one indoor floor plane and a staircase position; and determine a target azimuth corresponding to the target virtual object on the azimuth indicator, according to the azimuth information; and a first displaying module, configured to display an azimuth indication icon of the target virtual object, at a position corresponding to the target azimuth in the target horizontal plane indication area.

The above apparatus is configured to execute the method provided in the foregoing embodiments, and has similar implementation principle and technical effects, which are not described herein again.

These above modules may be one or more integrated circuits configured to implement the above method, for example, one or more application specific integrated circuits (ASIC for short), or one or more digital signal processors (DSP for short), or one or more field programmable gate arrays (FPGA for short), etc. For another example, when a certain module above is implemented in the form of a processing element scheduling program code, the processing element may be a general purpose processor, for example, a central processing unit (CPU for short) or other processors that can invoke the program code. For another example, these modules may be integrated together and implemented in the form of a system-on-a-chip (SOC for short).

FIG. 11 is a structural schematic diagram of a terminal provided in an embodiment of the present disclosure, and as shown in FIG. 11, the terminal may include: a processor 1401 and a memory 1402.

In the above, the memory 1401 is configured to store a program, and the processor 1402 invokes the program stored in the memory 602, so as to execute the above method embodiments.

Exemplarily, this method may include:

determining, according to a first position at which a controlled virtual character is located, in a game scene, and a second position at which a target virtual object is located, in the game scene, azimuth information and horizontal plane relative information on the target virtual object relative to the controlled virtual character;

determining a target azimuth corresponding to the target virtual object on the azimuth indicator, according to the azimuth information;

determining a target horizontal plane indication area corresponding to the target virtual object on the azimuth indicator, according to the horizontal plane relative information; and displaying an azimuth indication icon of the target virtual object, at a position corresponding to the target azimuth in the target horizontal plane indication area.

Optionally, the azimuth indicator includes a plurality of horizontal plane indication areas; and the step of determining a target horizontal plane indication area corresponding to the target virtual object on the azimuth indicator according to the horizontal plane relative information includes:

determining, according to the horizontal plane relative information, from the plurality of horizontal plane indication areas, a horizontal plane indication area consistent with the horizontal plane relative information, as the target horizontal plane indication area.

Optionally, the method further includes:

displaying the target horizontal plane indication area, and other indication areas in the plurality of horizontal plane indication areas differently.

Optionally, the step of displaying the target horizontal plane indication area and other indication areas in the plurality of horizontal plane indication areas differently includes:

displaying the target horizontal plane indication area and the other indication areas in different display transparencies;

alternatively, displaying the target horizontal plane and the other indication areas in different display colors.

Optionally, the step of determining the target azimuth corresponding to the target virtual object on the azimuth indicator according to the azimuth information includes:

determining, if the azimuth information indicates that relative azimuth of the controlled virtual character to the target virtual object is within an indication range of the azimuth indicator, the target azimuth corresponding to the target virtual object on the azimuth indicator, according to the azimuth information; and determining, if the azimuth information indicates that the relative azimuth of the controlled virtual character to the target virtual object is beyond the indication range of the azimuth indicator, an edge position on the azimuth indicator, as the target azimuth corresponding to the target virtual object.

Optionally, the step of determining, according to a first position at which a controlled virtual character is located in a game scene and a second position at which a target virtual object is located in the game scene, horizontal plane relative information on the target virtual object relative to the controlled virtual character includes:

determining a vertical projection distance between the target virtual object and the controlled virtual character, according to the first position and the second position;

determining, if the vertical projection distance is within a preset numerical range, the horizontal plane relative information for indicating that the target virtual object and the controlled virtual character are in a same horizontal plane; and determining, if the vertical projection distance is not within the preset numerical range, the horizontal plane relative information for indicating that the target virtual object and the controlled virtual character are not in a same horizontal plane.

Optionally, the step of determining a vertical projection distance between the target virtual object and the controlled virtual character according to the first position and the second position includes:

determining a first vertical projection height of the target virtual object according to the first position;

determining a second vertical projection height of the controlled virtual character according to the second position; and determining the vertical projection distance between the target virtual object and the controlled virtual character, according to the first vertical projection height and the second vertical projection height.

Optionally, if the vertical projection distance is a difference of the first vertical projection height minus the second vertical projection height, the step of determining, if the vertical projection distance is not within the preset numerical range, the horizontal plane relative information for indicating that the target virtual object and the controlled virtual character are not in a same horizontal plane includes:

determining, if the vertical projection distance is greater than the maximum value in the preset numerical range, the horizontal plane relative information for indicating that a horizontal plane where the target virtual object is located is higher than a horizontal plane where the controlled virtual character is located; and determining, if the vertical projection distance is less than the minimum value in the preset numerical range, the horizontal plane relative information for indicating that the horizontal plane where the target virtual object is located is lower than the horizontal plane where the controlled virtual character is located.

Optionally, if the vertical projection distance is a difference of the second vertical projection height minus the first vertical projection height, the step of determining, if the vertical projection distance is not within the preset numerical range, the horizontal plane relative information for indicating that the target virtual object and the controlled virtual character are not in a same horizontal plane includes:

determining, if the vertical projection distance is greater than the maximum value in the preset numerical range, the horizontal plane relative information for indicating that the horizontal plane where the target virtual object is located is lower than the horizontal plane where the controlled virtual character is located; and determining, if the vertical projection distance is less than the minimum value in the preset numerical range, the horizontal plane relative information for indicating that the horizontal plane where the target virtual object is located is higher than the horizontal plane where the controlled virtual character is located.

Optionally, both the target virtual object and the controlled virtual character are located in the indoor scene in the game scene; and the step of determining, according to a first position at which the controlled virtual character is located in the game scene and a second position at which the target virtual object is located in the game scene, horizontal plane relative information on the target virtual object relative to the controlled virtual character includes:

determining a first layer number of the indoor scene where the first position is located and a second layer number of the indoor scene where the second position is located;

determining, if the first layer number and the second layer number are the same, the horizontal plane relative information for indicating that the target virtual object and the controlled virtual character are in a same horizontal plane; and determining, if the first layer number and the second layer number are different, the horizontal plane relative information for indicating that the target virtual object and the controlled virtual character are not in a same horizontal plane.

Optionally, the step of determining, if the first layer number and the second layer number are different, the horizontal plane relative information for indicating that the target virtual object and the controlled virtual character are not in a same horizontal plane includes:

determining, if the first layer number is greater than the second layer number, the horizontal plane relative information for indicating that the horizontal plane where the target virtual object is located is lower than the horizontal plane where the controlled virtual character is located; and determining, if the first layer number is less than the second layer number, the horizontal plane relative information for indicating that the horizontal plane where the target virtual object is located is higher than the horizontal plane where the controlled virtual character is located.

Optionally, if both the target virtual object and the controlled virtual character are in an indoor scene in the game scene, the method further includes:

determining, according to a first position at which the controlled virtual character is located, in the game scene, and a second position at which the target virtual object is located, in the game scene, azimuth information on the target virtual object relative to the controlled virtual character;

determining a target horizontal plane indication area corresponding to the target virtual object, according to an absolute position of the indoor scene where the second position is located, where the absolute position of the indoor scene includes: at least one indoor floor plane and a staircase position; and determining a target azimuth corresponding to the target virtual object on the azimuth indicator, according to the azimuth information; and displaying an azimuth indication icon of the target virtual object, at a position corresponding to the target azimuth in the target horizontal plane indication area.

To sum up, the azimuth information and the horizontal plane relative information on the target virtual object are determined according to the first position and the second position; then the target azimuth and the target horizontal plane indication area are determined; the azimuth indication icon is displayed at the position corresponding to the target azimuth in the target horizontal plane indication area, where the azimuth indication icon not only can indicate the azimuth of the target virtual object relative to the controlled virtual character, but also can indicate the horizontal plane relative information, i.e., can indicate a vertical spatial relationship, whether the two are in the same horizontal plane, etc., so that the presented position information on the target virtual object is more comprehensive, and the user experience is improved.

Optionally, the present disclosure further provides a program product, for example, a computer readable storage medium, including a program, and the program, when executed by a processor, is configured to execute the above method embodiments.

Exemplarily, this method may include:

determining, according to a first position at which a controlled virtual character is located, in a game scene, and a second position at which a target virtual object is located, in the game scene, azimuth information and horizontal plane relative information on the target virtual object relative to the controlled virtual character;

determining a target azimuth corresponding to the target virtual object on the azimuth indicator, according to the azimuth information;

determining a target horizontal plane indication area corresponding to the target virtual object on the azimuth indicator according to the horizontal plane relative information; and displaying an azimuth indication icon of the target virtual object at a position corresponding to the target azimuth in the target horizontal plane indication area.

Optionally, the azimuth indicator includes a plurality of horizontal plane indication areas; and the step of determining a target horizontal plane indication area corresponding to the target virtual object on the azimuth indicator according to the horizontal plane relative information includes:

determining, according to the horizontal plane relative information, from the plurality of horizontal plane indication areas, a horizontal plane indication area consistent with the horizontal plane relative information, as the target horizontal plane indication area.

Optionally, the method further includes:

displaying the target horizontal plane indication area, and other indication areas in the plurality of horizontal plane indication areas differently.

Optionally, the step of displaying the target horizontal plane indication area and other indication areas in the plurality of horizontal plane indication areas differently includes:

displaying the target horizontal plane indication area and the other indication areas in different display transparencies;

alternatively, displaying the target horizontal plane and the other indication areas in different display colors.

Optionally, the step of determining a target azimuth corresponding to the target virtual object on the azimuth indicator according to the azimuth information includes:

determining, if the azimuth information indicates that relative azimuth of the controlled virtual character to the target virtual object is within an indication range of the azimuth indicator, the target azimuth corresponding to the target virtual object on the azimuth indicator, according to the azimuth information; and determining, if the azimuth information indicates that the relative azimuth of the controlled virtual character to the target virtual object is beyond the indication range of the azimuth indicator, an edge position on the azimuth indicator, as the target azimuth corresponding to the target virtual object.

Optionally, the step of determining, according to a first position at which a controlled virtual character is located in a game scene and a second position at which a target virtual object is located in the game scene, horizontal plane relative information on the target virtual object relative to the controlled virtual character includes:

determining a vertical projection distance between the target virtual object and the controlled virtual character, according to the first position and the second position;

determining, if the vertical projection distance is within a preset numerical range, the horizontal plane relative information for indicating that the target virtual object and the controlled virtual character are in a same horizontal plane; and determining, if the vertical projection distance is not within the preset numerical range, the horizontal plane relative information for indicating that the target virtual object and the controlled virtual character are not in a same horizontal plane.

Optionally, the step of determining a vertical projection distance between the target virtual object and the controlled virtual character according to the first position and the second position includes:

determining a first vertical projection height of the target virtual object according to the first position;

determining a second vertical projection height of the controlled virtual character according to the second position; and determining the vertical projection distance between the target virtual object and the controlled virtual character, according to the first vertical projection height and the second vertical projection height.

Optionally, if the vertical projection distance is a difference of the first vertical projection height minus the second vertical projection height, the step of determining, if the vertical projection distance is not within the preset numerical range, the horizontal plane relative information for indicating that the target virtual object and the controlled virtual character are not in a same horizontal plane includes:

determining, if the vertical projection distance is greater than the maximum value in the preset numerical range, the horizontal plane relative information for indicating that the horizontal plane where the target virtual object is located is higher than the horizontal plane where the controlled virtual character is located; and determining, if the vertical projection distance is less than the minimum value in the preset numerical range, the horizontal plane relative information for indicating that the horizontal plane where the target virtual object is located is lower than the horizontal plane where the controlled virtual character is located.

Optionally, if the vertical projection distance is a difference of the second vertical projection height minus the first vertical projection height, the step of determining, if the vertical projection distance is not within the preset numerical range, the horizontal plane relative information for indicating that the target virtual object and the controlled virtual character are not in a same horizontal plane includes:

determining, if the vertical projection distance is greater than the maximum value in the preset numerical range, the horizontal plane relative information for indicating that the horizontal plane where the target virtual object is located is lower than the horizontal plane where the controlled virtual character is located; and determining, if the vertical projection distance is less than the minimum value in the preset numerical range, the horizontal plane relative information for indicating that the horizontal plane where the target virtual object is located is higher than the horizontal plane where the controlled virtual character is located.

Optionally, both the target virtual object and the controlled virtual character are located in the indoor scene in the game scene; and the step of determining, according to a first position at which the controlled virtual character is located in the game scene and a second position at which the target virtual object is located in the game scene, horizontal plane relative information on the target virtual object relative to the controlled virtual character includes:

determining a first layer number of the indoor scene where the first position is located and a second layer number of the indoor scene where the second position is located;

determining, if the first layer number and the second layer number are the same, the horizontal plane relative information for indicating that the target virtual object and the controlled virtual character are in a same horizontal plane; and determining, if the first layer number and the second layer number are different, the horizontal plane relative information for indicating that the target virtual object and the controlled virtual character are not in a same horizontal plane.

Optionally, the step of determining, if the first layer number and the second layer number are different, the horizontal plane relative information for indicating that the target virtual object and the controlled virtual character are not in a same horizontal plane includes:

determining, if the first layer number is greater than the second layer number, the horizontal plane relative information for indicating that the horizontal plane where the target virtual object is located is lower than the horizontal plane where the controlled virtual character is located; and determining, if the first layer number is less than the second layer number, the horizontal plane relative information for indicating that the horizontal plane where the target virtual object is located is higher than the horizontal plane where the controlled virtual character is located.

Optionally, if both the target virtual object and the controlled virtual character are in an indoor scene in the game scene, the method further includes:

determining, according to a first position at which the controlled virtual character is located in the game scene, and a second position at which the target virtual object is located in the game scene, azimuth information on the target virtual object relative to the controlled virtual character;

determining a target horizontal plane indication area corresponding to the target virtual object, according to an absolute position of the indoor scene where the second position is located, where the absolute position of the indoor scene includes: at least one indoor floor plane and a staircase position; and determining a target azimuth corresponding to the target virtual object on the azimuth indicator, according to the azimuth information; and displaying an azimuth indication icon of the target virtual object, at a position corresponding to the target azimuth in the target horizontal plane indication area.

To sum up, the azimuth information and the horizontal plane relative information on the target virtual object are determined according to the first position and the second position; then the target azimuth and the target horizontal plane indication area are determined; the azimuth indication icon is displayed at the position corresponding to the target azimuth in the target horizontal plane indication area, where the azimuth indication icon not only can indicate the azimuth of the target virtual object relative to the controlled virtual character, but also can indicate the horizontal plane relative information, i.e., can indicate the vertical spatial relationship, whether the two are in the same horizontal plane, etc., so that the presented position information on the target virtual object is more comprehensive, and the user experience is improved.

In the several embodiments provided in the present disclosure, it should be understood that the disclosed apparatus and method can be implemented in other manners. For example, the apparatus embodiments described in the above are merely exemplary, for example, the division of the units is merely a division according to logical functions, and it may be a division in other manners in practical implementation, for example, multiple units or components may be combined or may be integrated into another system, or some features may be omitted, or not executed. In addition, the mutual coupling or direct coupling or communication connection shown or discussed may be implemented via indirect coupling or communication connection through some interfaces, means or units, which may be electrical, mechanical, or in other forms.

The units described as separate parts may be or also may not be physically separated, and the parts displayed as units may be or also may not be physical units, i.e., they may be located at one place, or also may be distributed on a plurality of network units. Part or all of the units may be selected according to actual needs so as to achieve the objectives of the solutions in the embodiments.

Besides, various functional units in various embodiments of the present disclosure can be integrated into one processing unit, or each unit also may exist in a physically independent way, or two or more units may be integrated into one unit. The above integrated unit may be implemented in the form of hardware, or in the form of hardware plus a software functional unit.

The above integrated unit implemented in the form of software functional unit may be stored in a computer readable storage medium. The above software functional unit is stored in a storage medium, including several instructions configured to make a computer device (which can be a personal computer, a sever or a network device etc.) or a processor execute part of the steps of the methods described in various embodiments of the present disclosure. The aforementioned storage medium includes various media that can store program codes, such as U disk, mobile hard disk, read-only memory (ROM for short), random access memory (RAM for short), magnetic disk or optical disk.

The above is only preferred embodiments of the present disclosure, and is not used to limit the present disclosure, and various changes and modifications may be made to the present disclosure for a person skilled in the art. Any modifications, equivalent substitutions, improvements and the like made within the spirit and principle of the present disclosure should be covered within the scope of protection of the present disclosure.

What is claimed is:

1. A display method in a game, comprising:
determining, by a terminal, azimuth information and horizontal plane relative information on a target virtual object relative to a controlled virtual character, according to a first position at which the controlled virtual character is located in a game scene, and a second position at which the target virtual object is located in the game scene, wherein a graphical user interface is provided by the terminal, and an azimuth indicator is displayed in the graphical user interface;

determining, by the terminal, a target azimuth corresponding to the target virtual object on the azimuth indicator, according to the azimuth information;

determining, by the terminal, a target horizontal plane indication area corresponding to the target virtual object on the azimuth indicator, according to the horizontal plane relative information; and displaying, by the terminal, an azimuth indication icon of the target virtual object at a position corresponding to the target azimuth in the target horizontal plane indication area, wherein both the target virtual object and the controlled virtual character are located in an indoor scene in the game scene; and wherein determining the horizontal plane relative information on the target virtual object relative to the controlled virtual character further comprises:

determining a first layer number of the indoor scene where the first position is located and a second layer number of the indoor scene where the second position is located;

in response to determining that the first layer number and the second layer number are the same, determining the horizontal plane relative information for indicating that the target virtual object and the controlled virtual character are in a same horizontal plane; and in response to determining that the first layer number and the second layer number are different, determining the horizontal plane relative information for indicating that the target virtual object and the controlled virtual character are not in a same horizontal plane.

2. The method according to claim 1, wherein the azimuth indicator comprises a plurality of horizontal plane indication areas; and wherein determining the target horizontal plane indication area corresponding to the target virtual object on the azimuth indicator, according to the horizontal plane relative information further comprises:

determining a horizontal plane indication area consistent with the horizontal plane relative information, as the target horizontal plane indication area, from the plurality of horizontal plane indication areas, according to the horizontal plane relative information.

3. The method according to claim 2, further comprising:

displaying the target horizontal plane indication area, and other indication areas in the plurality of horizontal plane indication areas differently.

4. The method according to claim 3, wherein displaying the target horizontal plane indication area, and the other indication areas in the plurality of horizontal plane indication areas differently further comprises:

displaying the target horizontal plane indication area and the other indication areas in different display transparencies; or displaying the target horizontal plane indication area and the other indication areas in different display colors.

5. The method according to claim 4, wherein display-transparency of the target horizontal plane indication area is greater than a preset transparency threshold; and display-transparency of the other indication areas is less than the preset transparency threshold.

6. The method according to claim 4, wherein display-color of the target horizontal plane indication area is set to be a bright color; and display-color of the other indication areas is set to be a dark color.

7. The method according to claim 2, wherein determining the horizontal plane relative information on the target virtual object relative to the controlled virtual character further comprises:

determining a vertical projection distance between the target virtual object and the controlled virtual character, according to the first position and the second position;

in response to determining that the vertical projection distance is within a preset numerical range, determining the horizontal plane relative information for indicating that the target virtual object and the controlled virtual character are in a same horizontal plane; and in response to determining that the vertical projection distance is not within the preset numerical range, determining the horizontal plane relative information for indicating that the target virtual object and the controlled virtual character are not in a same horizontal plane.

8. The method according to claim 7, wherein determining the vertical projection distance between the target virtual object and the controlled virtual character further comprises:

determining a first vertical projection height of the target virtual object according to the first position;

determining a second vertical projection height of the controlled virtual character according to the second position; and determining the vertical projection distance between the target virtual object and the controlled virtual character, according to the first vertical projection height and the second vertical projection height.

9. The method according to claim 8, wherein determining the horizontal plane relative information for indicating that the target virtual object and the controlled virtual character are not in the same horizontal plan further comprises:

in response to determining that the vertical projection distance is greater than a maximum value in the preset numerical range, determining the horizontal plane relative information for indicating that a horizontal plane where the target virtual object is located is higher than a horizontal plane where the controlled virtual character is located; and in response to determining that the vertical projection distance is less than a minimum value in the preset numerical range, determining the horizontal plane relative information for indicating that the horizontal plane where the target virtual object is located is lower than the horizontal plane where the controlled virtual character is located.

10. The method according to claim 8, wherein determining the horizontal plane relative information for indicating that the target virtual object and the controlled virtual character are not in the same horizontal plane further comprises:

in response to determining that the vertical projection distance is greater than a maximum value in the preset numerical range, determining the horizontal plane relative information for indicating that a horizontal plane where the target virtual object is located is lower than a horizontal plane where the controlled virtual character is located; and in response to determining that the vertical projection distance is less than a minimum value in the preset numerical range, determining the horizontal plane relative information for indicating that the horizontal plane where the target virtual object is located is higher than the horizontal plane where the controlled virtual character is located.

11. The method according to claim 1, wherein determining the target azimuth corresponding to the target virtual object on the azimuth indicator, according to the azimuth information further comprises:

in response to determining that the azimuth information indicates that relative azimuth of the controlled virtual character to the target virtual object is within an indication range of the azimuth indicator, determining the target azimuth corresponding to the target virtual object on the azimuth indicator, according to the azimuth information; and in response to determining that the azimuth information indicates that the relative azimuth of the controlled virtual character to the target virtual object is beyond the indication range of the azimuth indicator, determining an edge position on the azimuth indicator, as the target azimuth corresponding to the target virtual object.

12. The method according to claim 1, wherein determining the horizontal plane relative information for indicating that the target virtual object and the controlled virtual character are not in the same horizontal plane further comprises:

in response to determining that the first layer number is greater than the second layer number, determining the horizontal plane relative information for indicating that a horizontal plane where the target virtual object is located is lower than a horizontal plane where the controlled virtual character is located; and in response to determining that the first layer number is less than the second layer number, determining the horizontal plane relative information for indicating that the horizontal plane where the target virtual object is located is higher than the horizontal plane where the controlled virtual character is located.

13. The method according to claim 1, wherein in response to determining that both the target virtual object and the controlled virtual character are in an indoor scene in the game scene, the method further comprises:

determining the azimuth information on the target virtual object relative to the controlled virtual character, according to the first position at which the controlled virtual character is located, in the game scene, and the second position at which the target virtual object is located, in the game scene;

determining the target horizontal plane indication area corresponding to the target virtual object, according to an absolute position of the indoor scene where the second position is located, wherein the absolute position of the indoor scene comprises: at least one indoor floor plane, or a staircase position;

determining the target azimuth corresponding to the target virtual object on the azimuth indicator, according to the azimuth information; and displaying the azimuth indication icon of the target virtual object, at a position corresponding to the target azimuth in the target horizontal plane indication area.

14. The method according to claim 13, wherein displaying the azimuth indication icon of the target virtual object at the position corresponding to the target azimuth in the target horizontal plane indication area further comprises:

determining a vertical line at the target azimuth, and displaying the azimuth indication icon at the vertical line in the target horizontal plane indication area on the azimuth indicator.

15. The method according to claim 1, wherein the azimuth information comprises east, south, west, and north.

16. The method according to claim 1, wherein the azimuth indicator is strip-shaped and laterally distributed, and the azimuth indicator comprises a plurality of laterally distributed scales, wherein each scale comprises a corresponding azimuth identifier.

17. The method according to claim 1, wherein the game scene is further displayed in the graphical user interface, the game scene comprises the controlled virtual character, and the azimuth indicator is displayed in middle at a top of the graphical user interface.

18. A terminal, comprising: a memory and a processor, wherein the memory stores a computer program executable by the processor, and the processor, when executing the computer program, implements a display method in a game, with the method comprising:

determining azimuth information and horizontal plane relative information on a target virtual object relative to a controlled virtual character, according to a first position at which the controlled virtual character is located in a game scene, and a second position at which the target virtual object is located in the game scene, wherein a graphical user interface is provided by the terminal, and an azimuth indicator is displayed in the graphical user interface;

determining a target azimuth corresponding to the target virtual object on the azimuth indicator, according to the azimuth information;

determining a target horizontal plane indication area corresponding to the target virtual object on the azimuth indicator, according to the horizontal plane relative information; and displaying an azimuth indication icon of the target virtual object, at a position corresponding to the target azimuth in the target horizontal plane indication area, wherein both the target virtual object and the controlled virtual character are located in an indoor scene in the game scene; and wherein determining the horizontal plane relative information on the target virtual object relative to the controlled virtual character further comprises:

determining a first layer number of the indoor scene where the first position is located and a second layer number of the indoor scene where the second position is located;

in response to determining that the first layer number and the second layer number are the same, determining the horizontal plane relative information for indicating that the target virtual object and the controlled virtual character are in a same horizontal plane; and in response to determining that the first layer number and the second layer number are different, determining the horizontal plane relative information for indicating that the target virtual object and the controlled virtual character are not in a same horizontal plane.

19. A non-transitory storage medium, storing a computer program, wherein the computer program, when read and executed, implements a display method in a game, with the method comprising:

determining azimuth information and horizontal plane relative information on a target virtual object relative to a controlled virtual character, according to a first position at which the controlled virtual character is located in a game scene, and a second position at which the target virtual object is located in the game scene, wherein a graphical user interface is provided by a terminal, and an azimuth indicator is displayed in the graphical user interface;

determining a target azimuth corresponding to the target virtual object on the azimuth indicator, according to the azimuth information;

determining a target horizontal plane indication area corresponding to the target virtual object on the azimuth indicator, according to the horizontal plane relative information; and displaying an azimuth indication icon of the target virtual object, at a position corresponding to the target azimuth in the target horizontal plane indication area, wherein both the target virtual object and the controlled virtual character are located in an indoor scene in the game scene; and wherein determining the horizontal plane relative information on the target virtual object relative to the controlled virtual character further comprises:

determining a first layer number of the indoor scene where the first position is located and a second layer number of the indoor scene where the second position is located;

in response to determining that the first layer number and the second layer number are the same, determining the horizontal plane relative information for indicating that the target virtual object and the controlled virtual character are in a same horizontal plane; and in response to determining that the first layer number and the second layer number are different, determining the horizontal plane relative information for indicating that the target virtual object and the controlled virtual character are not in a same horizontal plane.

\* \* \* \* \*